(12) United States Patent
Boix Jaen

(10) Patent No.: US 8,356,706 B2
(45) Date of Patent: Jan. 22, 2013

(54) CONVEYOR DEVICE FOR FLAT CARDBOARD SHEETS IN CARDBOARD-BOX FORMING MACHINES

(75) Inventor: José Boix Jaen, San Isidro de Albatera (ES)

(73) Assignee: Boix Maquinaria, S.L., San Isidro de Albatera (Alicante) (ES)

( * ) Notice: Subject to any disclaimer, the term of this patent is extended or adjusted under 35 U.S.C. 154(b) by 0 days.

(21) Appl. No.: 13/308,769

(22) Filed: Dec. 1, 2011

(65) Prior Publication Data
US 2012/0138429 A1    Jun. 7, 2012

Related U.S. Application Data

(63) Continuation of application No. PCT/ES2010/070875, filed on Dec. 30, 2010.

(30) Foreign Application Priority Data

Jan. 14, 2010   (ES) .................................. 201030029

(51) Int. Cl.
*B65G 15/58*    (2006.01)
(52) U.S. Cl. ..................................... 198/698; 198/460.1
(58) Field of Classification Search .................. None
See application file for complete search history.

(56) References Cited

U.S. PATENT DOCUMENTS

| | | | | |
|---|---|---|---|---|
| 1,761,771 A | * | 6/1930 | Brownell | 53/389.3 |
| 4,142,453 A | * | 3/1979 | Gidewall et al. | 493/100 |
| 4,205,501 A | * | 6/1980 | Michels | 53/228 |
| 4,499,704 A | * | 2/1985 | Bacon et al. | 53/156 |
| 5,637,183 A | | 6/1997 | Börner | |
| 5,653,671 A | * | 8/1997 | Reuteler | 493/313 |
| 6,215,205 B1 | | 4/2001 | Banas et al. | |

FOREIGN PATENT DOCUMENTS

| | | |
|---|---|---|
| ES | 185646 | 7/1974 |
| ES | 2 008 134 | 7/1989 |
| ES | 2 176 483 | 12/2002 |
| FR | 2 911 332 | 7/2008 |

OTHER PUBLICATIONS

International Search Report issued Jun. 6, 2011 in International (PCT) Application No. PCT/ES2010/070875.

* cited by examiner

*Primary Examiner* — Kavel Singh
(74) *Attorney, Agent, or Firm* — Wenderoth, Lind & Ponack, LLP.

(57) ABSTRACT

This comprises a horizontal entraining loader (1) on which are placed in an initial zone several piled cardboard sheets (12) to be driven by several transversal pushers (13) to a forming station (14) for cardboard boxes (23), said transversal pushers (13) being connected to a lateral chain (2) coupled to several end pinions (3) connected to several cross axles (4-4'). It is characterized in that the horizontal entrainment loader (1) can be adjusted longitudinally, thereby varying the distance between the transverse axles (4-4'), including for this purpose a vertically moveable tractive mechanism (8), that has a clutch mechanism (20) by means of which the movement is transmitted to a large cogwheel unit (17) and to an encoder (16) arranged coaxially with said large cogwheel unit (17), without ever losing the link between aforementioned encoder (16) and the respective transversal pusher (13).

18 Claims, 5 Drawing Sheets

CONVEYOR DEVICE FOR FLAT CARDBOARD SHEETS IN CARDBOARD-BOX FORMING MACHINES

This application is a Continuation of International Application PCT/ES2010/070875, filed Dec. 30, 2010, which is hereby incorporated by reference in its entirety.

OBJECT OF THE INVENTION

The present invention, as stated in the title of this specification refers to a flat cardboard sheet conveyor device for boxes forming machines, and more particularly to a device for pulling flat cardboard sheets from a dispensing stack arranged in the initial area of the conveyor device towards a station for forming the cardboard boxes provided at the end of the same conveyor device.

The new device of the invention provides simplicity in adjusting the conveyor in order to be suited to the different sizes of boxes, lengthening or shortening thereof, from the forming station.

BACKGROUND OF THE INVENTION

Currently, there are cardboard-box forming machines, among which should be noted, for example, U.S. Pat. No. 556,259.

The boxes are formed by folding the sides of a preformed cardboard sheet for forming a cardboard box, said cardboard sheet comprising a bottom panel that forms the bottom of the box, on which two separate panels are articulated by their respective edges, making up its side walls articulated to said bottom and those parts overlapping and adhering to two of such sides.

On this basis, the machine of the referred Invention patent is characterized in that it comprises, among other features, the following:
- A station for storing preformed cardboard sheets from which said sheets are supplied, one by one, to form with them containers or boxes.
- Means for extracting the sheets contained in the storage station in order to deposit thereof between parallel guides arranged at the exit of the warehouse.
- Means for establishing a mechanism for transmitting force and motion, which acts on the removable sheets, making them slide on and between such guides until introducing thereof in the molding or forming station.

The cardboard boxes forming machines, among which is included the mentioned U.S. Pat. No. 556,259, in order to adjust the format of the box, require a length sufficient to modify the size of the conveyor of the preformed sheets or plates and the use of complex devices that ensure the correct tension of some chains and components making it up.

On the other hand, if it is accidentally stopped by some blockage of the above, it is necessary to synchronize again the thruster parts with the actual location of the cardboard sheets.

DESCRIPTION OF THE INVENTION

To achieve the objectives and avoid the drawbacks mentioned in the preceding paragraphs, the invention proposes a flat cardboard sheet conveyor device for boxes forming machines, which conveyor device pulls the flat cardboard sheets from a dispensing stack arranged in an initial area of the conveyor device, towards a forming station provided at the end of the conveyor device.

On this basis, the invention is characterized in that it includes means for varying the length of a horizontal entraining loader in combination with a tractive mechanism vertically movable along a fixed support, so that by varying the length of that tractive mechanism such tractive mechanism is raised or lowered, thus obtaining the desired length of said horizontal entraining loader according to the needs required depending on the sizes of the cardboard sheets and the relative location of the box forming station, supporting such flat cardboard sheets on that horizontal entraining loader.

This horizontal entraining loader essentially consists of a lateral chain coupled to a pair of end pinions, coupled to cross axles, to which a guiding structure that allows regulating the length of the horizontal entraining loader and thus varying the distance between said cross axles mentioned above is jointly connected.

The closed-loop lateral chain is in turn coupled to a large cogwheel and also to a tractive cogwheel that is part of the tractive mechanism, with a clutch mechanism being sandwiched in the transmission of motion in order to disengage that the transmission if needed when a blockage occurs.

In this way we avoid and/or moderate aggressive mechanical shocks or motor stops that can break any component of the conveyor.

The lateral chain includes transverse pushers to ensure the pulling of the flat cardboard sheets in forward movement along the horizontal entraining loader.

On the other hand, electronic means have been provided, such as an encoder, to always know the position of the drive chain and therefore of the transverse pushers for the flat cardboard sheets, which is essential to avoid manual adjustments to synchronize these components with the suction system that carries said flat cardboard sheets over the assembly of the conveyor device of the invention.

In a preferred embodiment of the invention, one of the end pinions is a double pinion that is connected to the cross axle connected to the tractive mechanism. This axle is also connected to a cross axle that is on the part of the entraining loader wherein the forming station is located, and which has a cross axle that is in the initial area of the entraining loader.

Thus, the entraining loader is divided into two sections, which are a first section comprising the initial area of the entraining loader and a second section that comprises the area in which the forming station is located. With the addition of the double pinion movement is provided for both the first section and second section of the entraining loader.

This embodiment is especially useful when you need to perform a first stage for transporting the cardboard sheets, in great length machines or machines that require previous operations.

So as in order to provide motion to the first section of the entraining loader, the same engine and the same clutch system are used as to provide motion to the second section of the entraining loader, there is achieved a very safe machine and no problems of synchronizing or mismatches.

In another preferred embodiment of the invention, the horizontal entraining loader is moved through various cross axles wherein simple pinions are connected. These cross axles are in fixed positions. In this preferred embodiment, the tractive mechanism is also in a fixed position.

This embodiment uses the same engine and the same clutch system described above, but in this case the elements of the device are fixed so that the conveyor device is simpler, very safe and has no problems of synchronization or mismatches.

Next, to provide a better understanding of this specification and being an integral part thereof, some figures wherein in an

DESCRIPTION OF THE PREFERRED EMBODIMENT

Figure 1:
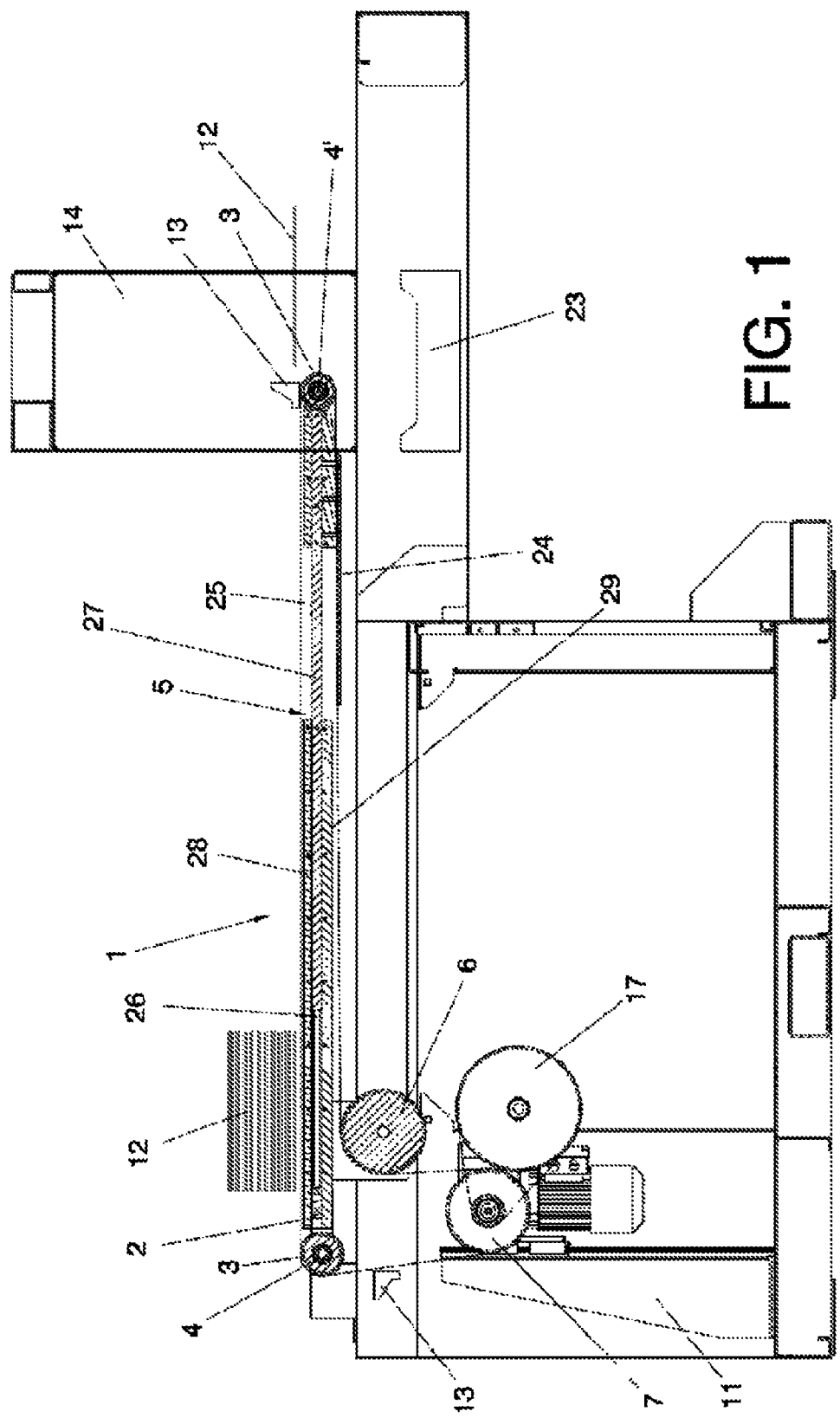
FIG. 1.—Shows an elevation view of the flat cardboard sheet conveyor device for boxes forming machines, object of the invention.
Figure 2:
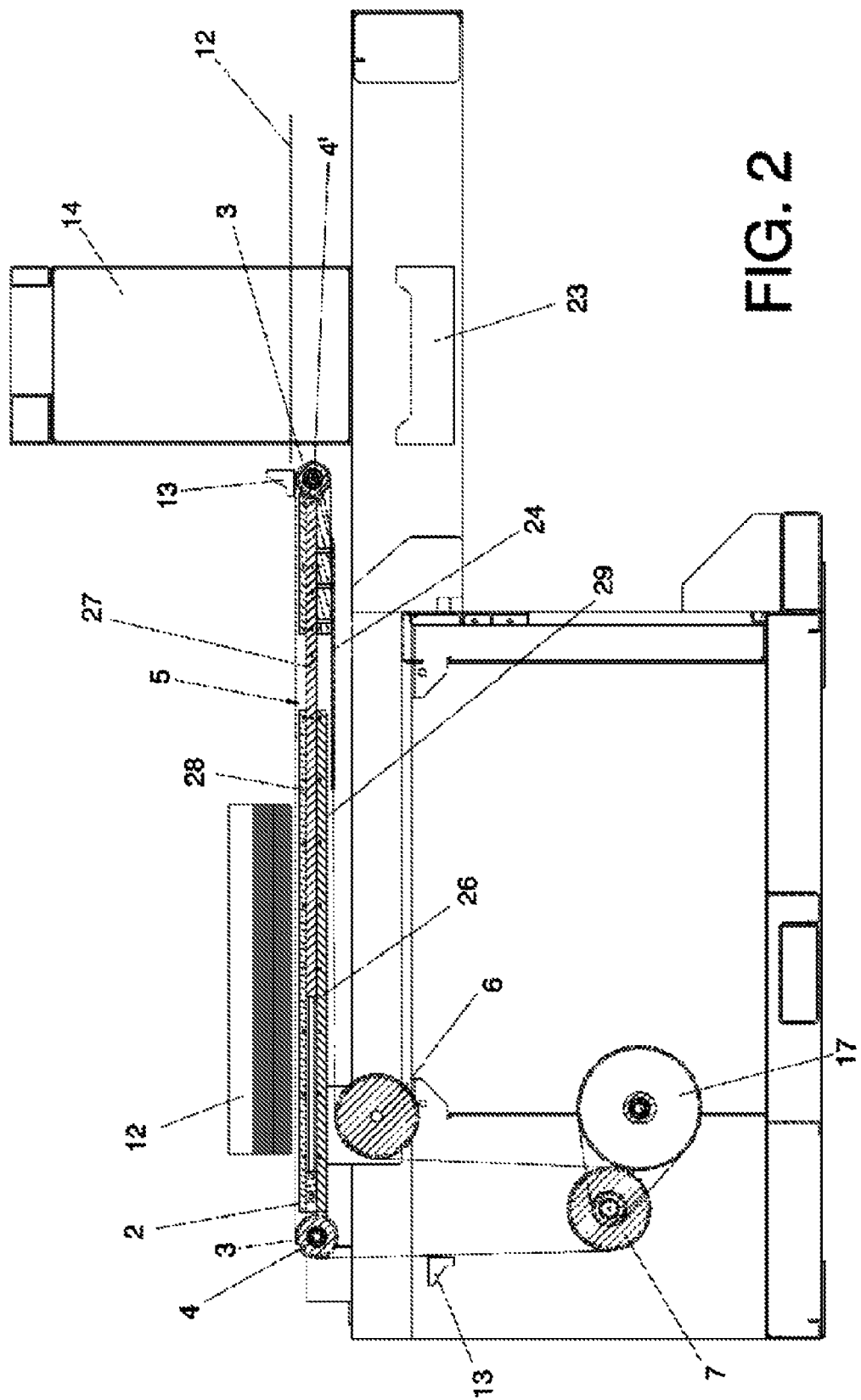
FIG. 2.—Shows another elevation view of the conveyor device of the invention in a different location to that shown in FIG. 1.

Considering the numbering adopted in the figures, the conveyor device for flat cardboard sheets in cardboard-box forming machines is determined from a horizontal entraining loader 1 comprising a lateral chain 2 in principle coupled to two end pinions 3, these being in turn coupled to cross axles 4-4', to which a guiding structure 5 that allows adjusting the length of the horizontal entraining loader 1 and therefore the distance between the cross axles 4-4' is jointly connected. In addition, on said guiding structure 5 the lateral chain 2 is moved.

For such purpose, the lateral chain 2 is coupled to a upper cogwheel 6 arranged below the horizontal entraining loader 1, said lateral chain 2 also being coupled to a tractive cogwheel 7 that is part of a vertically movable tractive mechanism 8 by being supported on a movable carriage 9 driven in vertical guides 10 of a fixed support 11, so that the vertical positioning of the tractive mechanism 8 is achieved by varying the length of the horizontal entraining loader 1 moving the cross axle 4' backward or forward. This loader supports the flat cardboard sheets 12 that are pulled forward by transverse pushers 13 integral with the lateral chain 2 until reaching a forming station 14 for forming the boxes 23, which final forming station is located at the end of the assembly of the conveyor device. In contrast, in an initial area and below thereof, the tractive mechanism 8 is located.

Figure 3:
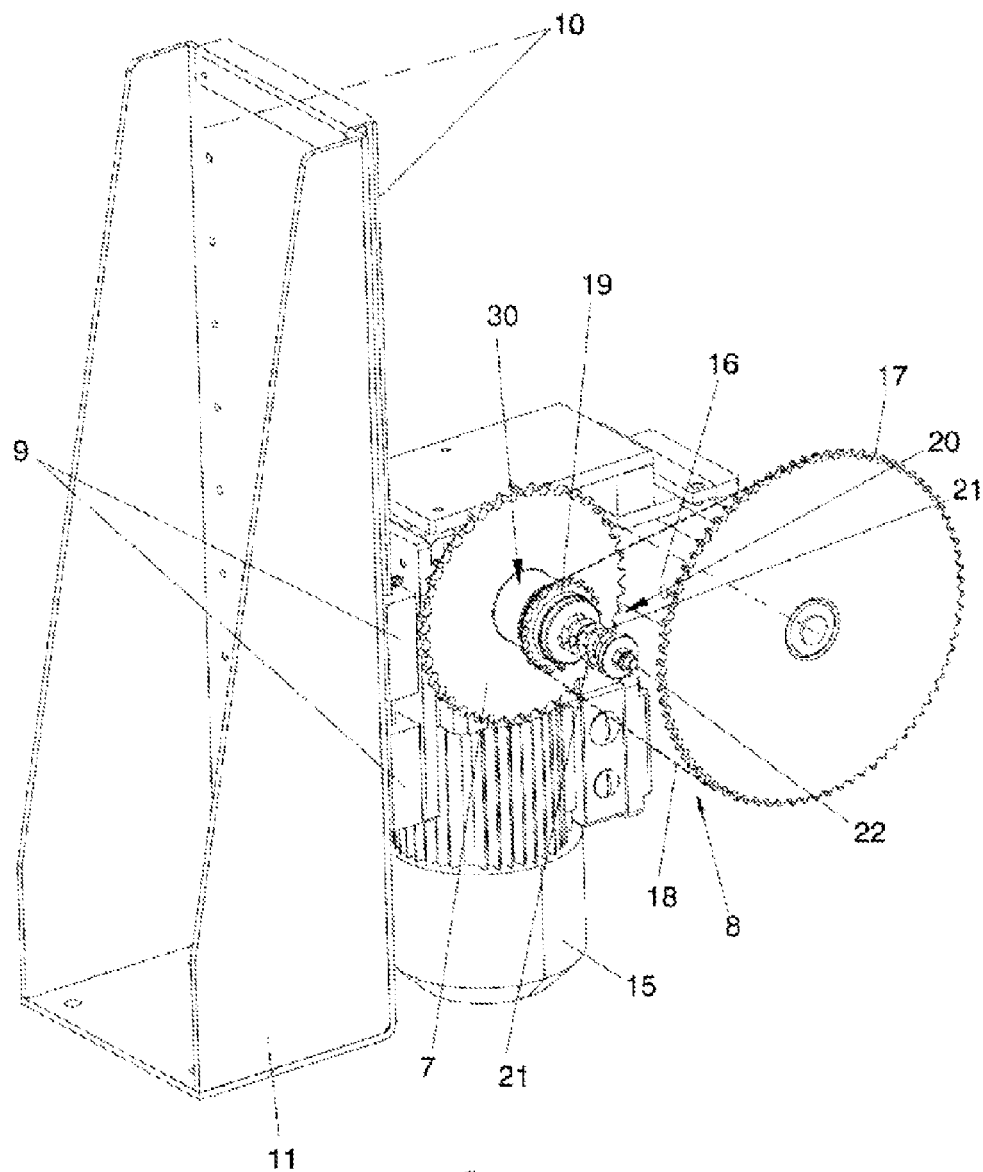
FIG. 3.—Shows a perspective view wherein a vertically movable tractive mechanism for adjusting the length of a horizontal entraining loader that is part of the conveyor device of the invention can be seen.
Figure 4:
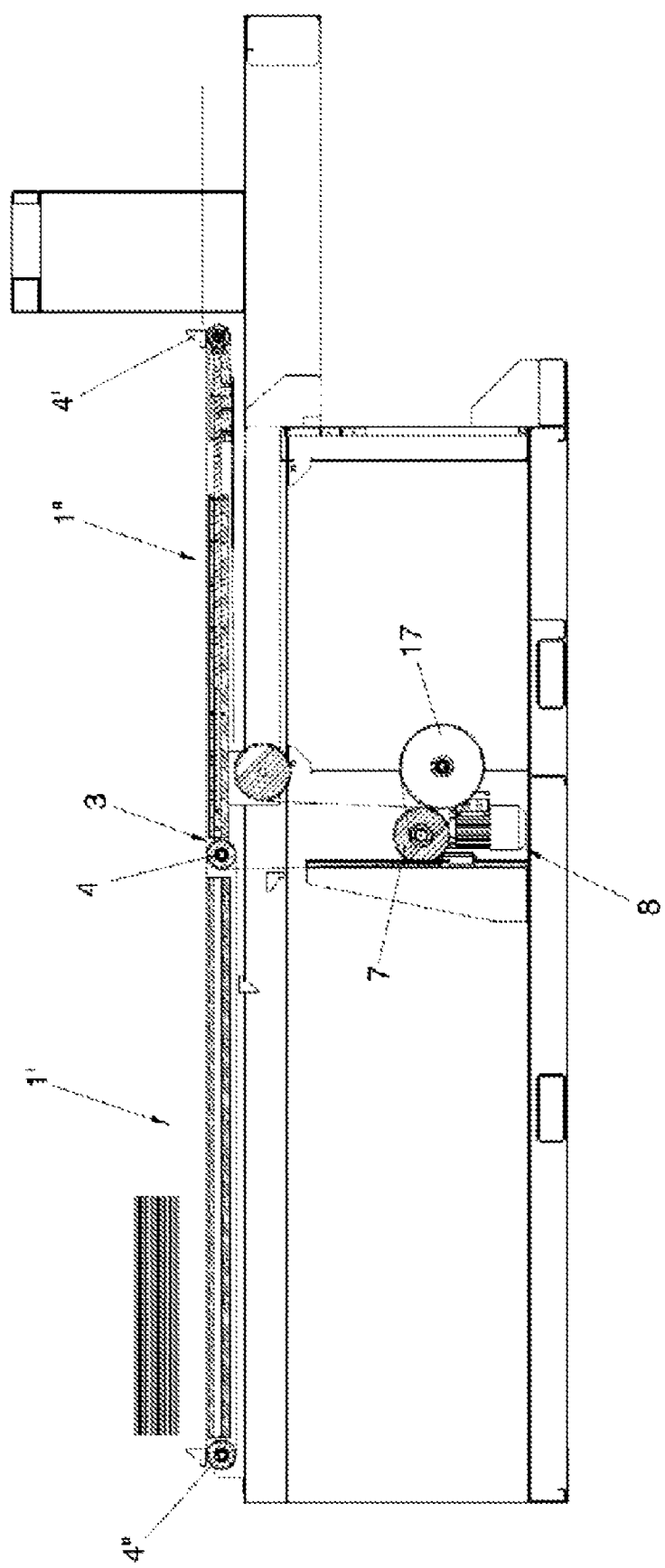
FIG. 4.—Shows an elevation view of the flat cardboard sheet conveyor device for boxes forming machines, in which the entraining loader is divided into a first section and a second section provided with motion.
Figure 5:
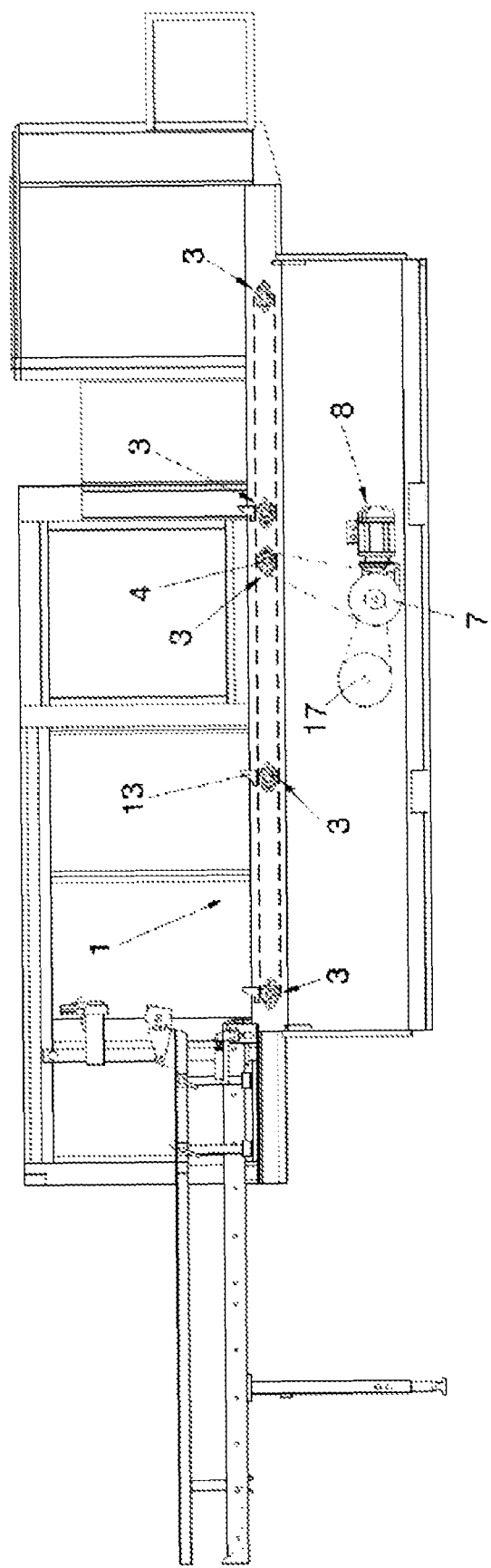
FIG. 5.—Shows an elevation view of an embodiment of the flat cardboard sheet conveyor device for boxes forming machines in which the cross axles of the entraining loader and the tractive mechanism are in a fixed position.

As shown more clearly in FIG. 3, the tractive mechanism 8 comprises a gear motor 15 output shaft 22 of which transmits its motion to a drive assembly 30 by means of a adjustable clutch mechanism 20 axially driven by a spring 21 for disengaging the transmission power if necessary, said drive assembly 30 including the tractive cogwheel 7 mentioned above and a central pinion 19 which transmits its motion to a large cogwheel 17 by an intermediate chain 18. Thanks to the clutch mechanism 20 aggressive mechanical shocks or geared motor stops that could break any component of the conveyor are avoided. In practice, a dry bite-type clutch has been chosen.

Through the connection of the central pinion 19 and the large cogwheel 17, the encoder 16 knows the position of the respective transverse thruster 13 at any time.

If by any chance a blockage of the transverse thruster 13 occurs, the clutch mechanism would act as follows.

The tractive cogwheel 7 would be blocked, disengaging by means of the clutch mechanism 20 from the rotation of the gear motor 15. The central pinion 19 forwarding to the encoder 16 would also be moved as being integral with the tractive cogwheel 7, so that the machine would continue to monitor the position of the respective transverse thruster 13.

In addition, if the clutch mechanism 20 does not exist, the gear motor 15 would try to keep moving the assembly of the encoder 16, so that the machine would lose the position of the transverse thruster 13 and once the blockage of that transverse thruster 13 is solved, the reference point between the encoder 16 and the respective transverse thruster 13 should be found again.

Thus, the lateral chain 2 that moves on the guiding structure 5 is driven by the tractive cogwheel 7, horizontally guided by the end pinions 3 and vertically by guided the upper sprocket wheel 6. On the lateral chain 2 transverse pushers 13 are mounted, which sequentially and alternatively push the cardboard sheets 12 stacked from an initial area of the horizontal entraining loader 1 to the area wherein the forming station 14 for forming the boxes 23 is located. To facilitate the change of measure the cross axle 4 corresponding with the end pinion 3 located at the beginning of the horizontal entraining loader 1 is fixed and then the axle 4' corresponding to the end pinion 3 located in correspondence with the forming station 14 is longitudinally moved forward and backward, as appropriate, bringing the movement of said cross axle 4' to the whole tractive mechanism 8. In this way, the horizontal run of the entire horizontal entraining loader 1 can be varied in the thrust area of the cardboard sheet 12. Also worth noting that to keep the length and tension of the chain all the tractive mechanism 8 is vertically moved, pulled by the longitudinal displacement of the cross axle 4' of the loader 1 as mentioned above.

The inclusion of the clutch mechanism 20 and the encoder 16, allows you never miss the connection between the respective transverse thruster 13 and said encoder 16, with the machine knowing at all times the position of the transverse thruster 13, although traffic jams occur by cardboard blockages.

Another important detail is that the device of the invention facilitates the change of measure, when changing the route of the horizontal entraining loader 1 in the working area in order to fit it to the measure of the corresponding cardboard sheet 12.

The guiding structure 5 that allows varying the length of the horizontal entraining loader 1 essentially comprises a flat centered body 27 guided between two sheets: top 28 and bottom 29, so that when the flat centered body 27 is longitudinally moved in conjunction with the posterior movable section of the horizontal entraining loader 1, the cross axle 4' and the end pinion 3 adjacent to the forming station 14 for forming the boxes 23, said longitudinal displacement will vertically pulled the whole tractive mechanism 8.

The posterior movable section of the horizontal entraining loader 1 includes a lower extension 24 which supports a portion of the lower branch of the lateral chain 2.

The posterior movable section of the horizontal entraining loader 1 is complemented with a longer anterior static section, defining an intermediate space 25 there between in order to adjust the length of the horizontal loader pulling 1, said intermediate space 25 being complemented with another initial space 26 established in the anterior static section and delimited between the two sheets 28 and 29, in order to perform the corresponding adjustment.

In a preferred embodiment of the invention, one of the end pinions 3 is a double pinion connected to the cross axle 4 which is connected to the tractive mechanism 8. In this embodiment, the cross axle 4 connected to the tractive mechanism 8 is in turn connected to the cross axle 4' which is part of the entraining loader 1 wherein the forming station 14 is located, and having a cross axle 4' that is located in the initial area of the entraining loader 1. Thus, in a first section 1' of the entraining loader 1, which runs from the cross axle 4" to the cross axle 4, and in a second section 1" of the entraining loader 1, which runs from the cross axle 4 to the cross axle 4', the chain 2 has movement.

The first section 1' of the entraining loader 1 has a fixed length. The second section 1" of the entraining loader 1 is adjustable in the longitudinal direction being able to vary its distance as described above.

In another preferred embodiment of the invention, the horizontal entraining loader 1 moves through various cross axles that are in fixed positions and in which simple pinions area connected. In this embodiment of the invention, the tractive mechanism 8 is also in a fixed position.

Among others, the advantages gained with the new conveyor device are the following:
- It allows reducing the length of the machine making it shorter and compact.
- It avoids the use of chain devices and/or tensioners ensuring the optimal tension, even when the length of the conveyor has been changed.
- It avoids complex adjustments when the conveyor is blocked or stopped by collision with a foreign object.
- It allows, when a blockage as those mentioned occurs, disconnecting the system from the motor torque preventing damages in the components or object caught.
- It eliminates problems of synchronization or mismatches.

The invention claimed is:

1. A conveyor device for flat cardboard sheets in cardboard-box forming machines, comprising:
   an encoder;
   a tractive mechanism;
   a clutch mechanism; and
   a horizontal entraining loader including
      a lateral chain that includes transverse pushers,
      cross axles, and
      end pinions connected to the cross axles;
   wherein the tractive mechanism is vertically movable and connected to the end pinions by the lateral chain, so that the length of the horizontal entraining loader is adjusted to the sizes of the cardboard sheets and to a relative location of a box forming station by varying the distance between the cross axles, and
      the tension of the lateral chain is maintained by varying the position of the tractive mechanism in the vertical direction;
   wherein the clutch mechanism is operably coupled to the tractive mechanism in order to disengage transmission if a blockage occurs; and
   wherein the encoder is connected to the tractive mechanism and controls the position of the transverse pushers.

2. The conveyor device according to claim 1, wherein the tractive mechanism comprises a gear motor having an output shaft which is coupled to a drive assembly that includes a tractive cogwheel that transmits motion to the lateral chain and a central pinion that transmits motion to a large cogwheel, with the output shaft of the gear motor pulling the drive assembly via the axially actuated clutch mechanism which is also coupled to the output shaft.

3. The conveyor device according to claim 2, wherein the lateral chain coupled to the end pinions, is also coupled to an upper cogwheel arranged above the tractive mechanism, and also to the tractive cogwheel that is part of said tractive mechanism.

4. The conveyor device according to claim 1, wherein the clutch mechanism includes an axially actuated spring coupled to an output shaft of a gear motor, around which a central pinion and a respective tractive cogwheel are also coupled, with both elements being simultaneously rotated by axial pressure exerted by the spring of the clutch mechanism.

5. The conveyor device according to claim 1, wherein the tractive mechanism is supported by a movable carriage vertically displaceable by being coupled to vertical guides of a fixed support.

6. The conveyor device according to claim 1, wherein the horizontal entraining loader comprises a guiding structure including a longer front static section, wherein a shorter rear movable section is guided by a flat centered body coupled between a top sheet and a bottom sheet, both being part of the front section of the horizontal entraining loader, the front static section and the rear movable section having two cross axles wherein the end pinions are coupled, so that the longitudinal displacement of the rear movable section will vertically pull the tractive mechanism.

7. The conveyor device according to claim 6, wherein the rear movable section of the horizontal entraining loader includes a lower extension on which a portion of a lower branch of the lateral chain is supported.

8. The conveyor device according to claim 1, wherein the pinion that is connected to the tractive mechanism is a double pinion, and said double pinion is connected to one of the cross axles that in turn is connected to a second of the cross axles and a third of the cross axles, so that the chain has movement in a first section of the entraining loader and in a second section of the entraining loader.

9. The conveyor device according to claim 1, wherein the horizontal entraining loader is divided into several sections by the cross axles that are in fixed positions, and the tractive mechanism is also in a fixed position.

10. The conveyor device according to claim 2, wherein the clutch mechanism includes an axially actuated spring coupled to the output shaft of the gear motor, around which the central pinion and the respective tractive cogwheel are also coupled, with both elements being simultaneously rotated by axial pressure exerted by the spring of the clutch mechanism.

11. The conveyor device according to claim 3, wherein the clutch mechanism includes an axially actuated spring coupled to the output shaft of the gear motor, around which the central pinion and the respective tractive cogwheel are also coupled, with both elements being simultaneously rotated by axial pressure exerted by the spring of the clutch mechanism.

12. The conveyor device according to claim 2, wherein the tractive mechanism is supported by a movable carriage vertically displaceable by being coupled to vertical guides of a fixed support.

13. The conveyor device according to claim 3, wherein the tractive mechanism is supported by a movable carriage vertically displaceable by being coupled to vertical guides of a fixed support.

14. The conveyor device according to claim 4, wherein the tractive mechanism is supported by a movable carriage vertically displaceable by being coupled to vertical guides of a fixed support.

15. The conveyor device according to claim 2, wherein the horizontal entraining loader comprises a guiding structure including a longer front static section, wherein a shorter rear movable section is guided by a flat centered body coupled between a top sheet and a bottom sheet, both being part of the front section of the horizontal entraining loader, the front static section and the rear movable section having two cross axles wherein the end pinions are coupled, so that the longitudinal displacement of the rear movable section will vertically pull the tractive mechanism.

16. The conveyor device according to claim 3, wherein the horizontal entraining loader comprises a guiding structure including a longer front static section, wherein a shorter rear movable section is guided by a flat centered body coupled between a top sheet and a bottom sheet, both being part of the front section of the horizontal entraining loader, the front static section and the rear movable section having two cross axles wherein the end pinions are coupled, so that the longitudinal displacement of the rear movable section will vertically pull the tractive mechanism.

17. The conveyor device according to claim 4, wherein the horizontal entraining loader comprises a guiding structure including a longer front static section, wherein a shorter rear movable section is guided by a flat centered body coupled between a top sheet and a bottom sheet, both being part of the front section of the horizontal entraining loader, the front static section and the rear movable section having two cross axles wherein the end pinions are coupled, so that the longitudinal displacement of the rear movable section will vertically pull the tractive mechanism.

18. The conveyor device according to claim 5, wherein the horizontal entraining loader comprises a guiding structure including a longer front static section, wherein a shorter rear movable section is guided by a flat centered body coupled between a top sheet and a bottom sheet, both being part of the front section of the horizontal entraining loader, the front static section and the rear movable section having two cross axles wherein the end pinions are coupled, so that the longitudinal displacement of the rear movable section will vertically pull the tractive mechanism.

\* \* \* \* \*